(12) United States Patent
Addison et al.

(10) Patent No.: US 10,829,059 B1
(45) Date of Patent: Nov. 10, 2020

(54) EXTENSIBLE TRUCK BED PLATFORM

(71) Applicants: David Addison, Bishopville, SC (US);
David J. Addison, Bishopville, SC (US)

(72) Inventors: David Addison, Bishopville, SC (US);
David J. Addison, Bishopville, SC (US)

( * ) Notice: Subject to any disclaimer, the term of this patent is extended or adjusted under 35 U.S.C. 154(b) by 127 days.

(21) Appl. No.: 16/242,065

(22) Filed: Jan. 8, 2019

(51) Int. Cl.
| | | |
|---|---|---|
| *B60R 13/01* | (2006.01) | |
| *B60P 1/43* | (2006.01) | |
| *B60R 5/04* | (2006.01) | |
| *B60P 1/00* | (2006.01) | |
| *B62D 33/02* | (2006.01) | |
| *B60P 7/08* | (2006.01) | |

(52) U.S. Cl.
CPC ............ *B60R 13/01* (2013.01); *B60P 1/003* (2013.01); *B60P 1/433* (2013.01); *B60P 7/0807* (2013.01); *B60R 5/041* (2013.01); *B62D 33/02* (2013.01); *B60Y 2200/14* (2013.01)

(58) Field of Classification Search
CPC ........ B60P 1/433; B60P 7/0807; B60R 5/041; B60R 13/01; B62D 33/02
USPC .............................................. 296/26.09, 39.2
See application file for complete search history.

(56) References Cited

U.S. PATENT DOCUMENTS

| | | | | |
|---|---|---|---|---|
| D224,219 S | * | 7/1972 | Ritter | D12/221 |
| D248,386 S | * | 7/1978 | Hefner | 296/39.2 |
| 4,681,360 A | | 7/1987 | Peters | |
| 4,872,719 A | * | 10/1989 | Cardwell | B60P 7/0815 296/34 |
| 4,909,558 A | * | 3/1990 | Roshinsky | B60R 13/01 296/37.6 |
| 4,936,724 A | * | 6/1990 | Dutton | B60P 7/0815 296/100.18 |
| 5,046,913 A | * | 9/1991 | Domek | B60P 1/433 24/514 |
| D325,716 S | * | 4/1992 | Larson | D12/221 |
| 5,308,133 A | * | 5/1994 | Mangum | B60R 13/01 24/295 |
| D350,105 S | * | 8/1994 | Schroeder | D12/221 |
| 5,419,603 A | * | 5/1995 | Kremer | B60P 7/0807 24/265 CD |
| 5,642,971 A | * | 7/1997 | Ragsdale | B60P 7/0815 296/36 |
| 5,827,024 A | * | 10/1998 | Davenport | B60P 7/0815 410/110 |

(Continued)

FOREIGN PATENT DOCUMENTS

CA        2278874        1/2000

*Primary Examiner* — Jason S Morrow
(74) *Attorney, Agent, or Firm* — Kyle A. Fletcher, Esq.

(57) ABSTRACT

The extensible truck bed platform comprises a liner and a sliding bed for a pickup truck. The sliding bed may slide rearward on rails when the truck's tailgate is down to ease the task of loading and unlocking the truck bed. The liner fits into and couples to the cargo bed of the pickup truck. The liner covers the floor, side walls, and front wall of the bed. The sliding bed slidably couples to the liner via rail guides located on the liner and rails located on the sliding bed. The placement and spacing of the guide and rails in combination with overhangs on both the guides and rails prevent the sliding bed from moving in vertically or laterally relative to the liner but allows forward and backward movement of the sliding bed.

17 Claims, 8 Drawing Sheets

(56) References Cited

U.S. PATENT DOCUMENTS

| | | | | |
|---|---|---|---|---|
| 5,882,058 A * | 3/1999 | Karrer | ................. | B60J 7/141 |
| | | | | 280/748 |
| 5,938,262 A | 8/1999 | Mills | | |
| 6,000,821 A * | 12/1999 | Beliakoff | ................. | B60Q 3/30 |
| | | | | 296/39.2 |
| 6,176,658 B1 * | 1/2001 | Rowe | ................. | B60P 7/0815 |
| | | | | 410/101 |
| 6,203,090 B1 * | 3/2001 | Vitoorapakorn | ....... | B62D 33/02 |
| | | | | 296/39.2 |
| 6,312,034 B1 * | 11/2001 | Coleman, II | ........... | B60P 1/003 |
| | | | | 296/26.09 |
| 6,464,274 B2 * | 10/2002 | Mink | ................. | B60P 1/003 |
| | | | | 296/26.09 |
| 6,491,331 B1 | 12/2002 | Fox | | |
| 6,827,532 B1 * | 12/2004 | Nix | ................. | B60P 7/0815 |
| | | | | 248/499 |
| 6,921,120 B1 | 7/2005 | Ervin | | |
| 7,121,603 B2 | 10/2006 | Stevenson | | |
| 7,175,060 B1 | 2/2007 | Carpenter | | |
| 7,237,817 B2 | 7/2007 | Kobyiski | | |
| 7,416,234 B2 * | 8/2008 | Bequette | ................. | B60P 1/003 |
| | | | | 296/26.08 |
| 7,445,263 B1 | 11/2008 | Bluhm | | |
| 9,073,487 B1 | 7/2015 | Marshall | | |
| 2002/0140245 A1 * | 10/2002 | Coleman, II | ............. | B60R 5/04 |
| | | | | 296/26.09 |
| 2005/0212317 A1 * | 9/2005 | Kobylski | ............... | B60R 5/041 |
| | | | | 296/26.09 |
| 2005/0280271 A1 * | 12/2005 | Suzuki | ................. | B60P 7/0807 |
| | | | | 296/3 |
| 2007/0210599 A1 | 9/2007 | Arnold | | |
| 2008/0211251 A1 * | 9/2008 | Diloreto | ................. | B60R 13/01 |
| | | | | 296/39.2 |
| 2013/0341949 A1 * | 12/2013 | Bernthisel | ......... | B62D 33/0273 |
| | | | | 296/26.09 |
| 2018/0272913 A1 * | 9/2018 | Marcum | ................. | B60P 1/433 |

\* cited by examiner

EXTENSIBLE TRUCK BED PLATFORM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cargo vehicles, more specifically, an extensible truck bed platform.

SUMMARY OF INVENTION

The extensible truck bed platform comprises a liner and a sliding bed for a pickup truck. The sliding bed may slide rearward on rails when the truck's tailgate is down to ease the task of loading and unlocking the truck bed. The liner fits into and couples to the cargo bed of the pickup truck. The liner covers the floor, side walls, and front wall of the bed. The sliding bed slidably couples to the liner via rail guides located on the liner and rails located on the sliding bed. The placement and spacing of the guide and rails in combination with overhangs on both the guides and rails prevent the sliding bed from moving in vertically or laterally relative to the liner but allows forward and backward movement of the sliding bed.

An object of the invention is to provide a liner for a pickup truck cargo bed.

Another object of the invention is to provide sliding bottom to the liner to ease in loading and unloading.

A further object of the invention is to provide cargo rails and cargo tiedown points for holding a cargo in the truck bed.

Yet another object of the invention is to provide power outlets accessible at the rear of the truck bed.

These together with additional objects, features and advantages of the extensible truck bed platform will be readily apparent to those of ordinary skill in the art upon reading the following detailed description of the presently preferred, but nonetheless illustrative, embodiments when taken in conjunction with the accompanying drawings.

In this respect, before explaining the current embodiments of the extensible truck bed platform in detail, it is to be understood that the extensible truck bed platform is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the extensible truck bed platform.

It is therefore important that the claims be regarded as including such equivalent construction insofar as they do not depart from the spirit and scope of the extensible truck bed platform. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 8.

The extensible truck bed platform 100 (hereinafter invention) comprises a bed liner 200 and a sliding bed 300. The bed liner 200 is a protective liner for a truck bed 905 of a pickup truck 900. The sliding bed 300 may be a movable bottom surface of the bed liner 200 that moves longitudinally within the bed liner 200 and may extend rearward beyond the bed liner 200. As a non-limiting example, sliding the sliding bed 300 rearward from a retracted position 395 to an extended position 390 may ease the task of loading or unloading the truck bed 905.

Throughout this document, directional terms front, rear, left, and right use a frame of reference that is aligned with the frame of reference for the pickup truck 900. As a non-limiting example, the rear of the bed liner 200 is at the rear of the pickup truck 900.

The bed liner 200 comprises a liner floor 210, a front wall 215, a lower left side wall 220, a lower right side wall 225, a left wheel well cover 230, a right wheel well cover 235, an upper left side wall 240, an upper right side wall 245, and a plurality of rail guides 280. The bed liner 200 may cover the interior front, bottom and side surfaces of the truck bed 905. The bed liner 200 may provide a mounting surface for the plurality of rail guides 280.

The liner floor 210 may be a rectangular panel located at the bottom center of the bed liner 200. The liner floor 210 may be horizontally oriented. The longitudinal length of the liner floor 210 may be less than the longitudinal length of the truck bed 905 such that the bed liner 200 fits into the truck bed 905 with a tailgate 910 in an up position. The front of the liner floor 210 may couple to an edge of the front wall 215. The left edge of the liner floor 210 may couple to the lower left side wall 220. The right edge of the liner floor 210 may couple to the lower right side wall 225.

The front wall 215 may be a T-shaped panel that forms one wall at the front of the bed liner 200. When the bed liner 200 is in place in the truck bed 905, the front wall 215 is located adjacent to a cab 915 of the pickup truck 900. The front wall 215 may be vertically oriented. The sides and lower edges of the front wall 215 may couple to the front edges of the upper left side wall 240, the left wheel well cover 230, the lower left side wall 220, the liner floor 210, the lower right side wall 225, the right wheel well cover 235, and the upper right side wall 245.

The lower left side wall 220 may be a rectangular panel located at the lower left of the bed liner 200. The lower left side wall 220 may be vertically oriented. The longitudinal length of the lower left side wall 220 may be less than the longitudinal length of the truck bed 905 such that the bed liner 200 fits into the truck bed 905 with the tailgate 910 in the up position. The front of the lower left side wall 220 may couple to an edge of the front wall 215. The top edge of the lower left side wall 220 may couple to the left wheel well cover 230. The bottom edge of the lower left side wall 220 may couple to the liner floor 210.

The lower right side wall 225 may be a rectangular panel located at the lower right of the bed liner 200. The lower right side wall 225 may be vertically oriented. The longitudinal length of the lower right side wall 225 may be less than the longitudinal length of the truck bed 905 such that the bed liner 200 fits into the truck bed 905 with the tailgate 910 in the up position. The front of the lower right side wall 225 may couple to an edge of the front wall 215. The top edge of the lower right side wall 225 may couple to the right wheel well cover 235. The bottom edge of the lower right side wall 225 may couple to the liner floor 210.

The left wheel well cover 230 may be a rectangular panel located on the left of the bed liner 200. The left wheel well cover 230 may be horizontally oriented. The longitudinal length of the left wheel well cover 230 may be less than the longitudinal length of the truck bed 905 such that the bed liner 200 fits into the truck bed 905 with the tailgate 910 in the up position. The front of the left wheel well cover 230 may couple to an edge of the front wall 215. The right edge of the left wheel well cover 230 may couple to the lower left side wall 220. The left edge of the left wheel well cover 230 may couple to the upper left side wall 240.

The right wheel well cover 235 may be a rectangular panel located on the right of the bed liner 200. The right wheel well cover 235 may be horizontally oriented. The longitudinal length of the right wheel well cover 235 may be less than the longitudinal length of the truck bed 905 such that the bed liner 200 fits into the truck bed 905 with the tailgate 910 in the up position. The front of the right wheel well cover 235 may couple to an edge of the front wall 215. The left edge of the right wheel well cover 235 may couple to the lower right side wall 225. The right edge of the right wheel well cover 235 may couple to the upper right side wall 245.

The upper left side wall 240 may be a rectangular panel located at the upper left of the bed liner 200. The upper left side wall 240 may be vertically oriented. The longitudinal length of the upper left side wall 240 may be less than the longitudinal length of the truck bed 905 such that the bed liner 200 fits into the truck bed 905 with the tailgate 910 in the up position. The front of the upper left side wall 240 may couple to an edge of the front wall 215. The bottom edge of the upper left side wall 240 may couple to the left wheel well cover 230.

The upper right side wall 245 may be a rectangular panel located at the upper right of the bed liner 200. The upper right side wall 245 may be vertically oriented. The longitudinal length of the upper right side wall 245 may be less than the longitudinal length of the truck bed 905 such that the bed liner 200 fits into the truck bed 905 with the tailgate 910 in the up position. The front of the upper right side wall 245 may couple to an edge of the front wall 215. The bottom edge of the upper right side wall 245 may couple to the right wheel well cover 235.

The top of the bed liner 200 may be open. The rear side of the bed liner 200 may be open and may be accessible when the tailgate 910 of the pickup truck 900 is in a down position.

As non-limiting examples, the front wall 215, the liner floor 210, the upper left side wall 240, the upper right side wall 245, the left wheel well cover 230, the right wheel well cover 235, the lower left side wall 220, and the lower right side wall 225 may be made from metal, fiberglass, plastic, or combinations thereof.

The plurality of rail guides 280 may be armatures coupled to the top surface of the liner floor 210. The plurality of rail guides 280 may be horizontally oriented and may run from front to rear. The plurality of rail guides 280 may all be parallel to each other. Each individual rail guide 285 selected from the plurality of rail guides 280 may comprise one or more guide overhangs 290 for interlocking with one of a plurality of rails 320.

The sliding bed 300 may be a movable, rectangular surface that slidably couples to the liner floor 210. The sliding bed 300 may be horizontally oriented. The lateral width of the sliding bed 300 may be less than the lateral width of the liner floor 210 such that the sliding bed 300 may move between the lower left side wall 220 of the bed liner 200 and the lower right side wall 225 of the bed liner 200. The longitudinal length of the sliding bed 300 may be less than the longitudinal length of the truck bed 905 such that the sliding bed 300 fits into the bed liner 200 with the tailgate 910 in the up position.

The sliding bed 300 may comprise the plurality of rails 320. The plurality of rails 320 may be armatures coupled to the bottom side of the sliding bed 300. The plurality of rails 320 may be horizontally oriented and may run from front to rear. The plurality of rails 320 may all be parallel to each other. Each individual rail 325 selected from the plurality of rails 320 may comprise one or more rail overhangs 330 for interlocking with one of the plurality of rail guides 280.

The lateral positioning and spacing of the plurality of rails 320 may correspond to the lateral positioning and spacing of the plurality of rail guides 280 such that the one or more rail overhangs 330 of each of the individual rails 325 overlap the one or more guide overhangs 290 of at least one of the individual rail guides 285. The positioning and overlapping of the plurality of rail guides 280 and the plurality of rails 320 prevents the sliding bed 300 from moving vertically or laterally but allows the sliding bed 300 to move longitudinally.

The space between the bed liner 200 and the truck bed 905 at the rear of the truck bed 905 may form a left storage cavity 360 and a right storage cavity 365. The left storage cavity 360 and the right storage cavity 365 may be accessible when the tailgate 910 is in the down position. The left storage cavity 360 and the right storage cavity 365 may be used for storage purposes. As non-limiting examples, tools may be stored in the left storage cavity 360, the right storage cavity 365, or both. The tools may be stored loose or in containers such as toolboxes.

In some embodiments, the invention 100 may comprise an outlet panel 370 covering the left storage cavity 360 or the right storage cavity 365. The outlet panel 370 may provide a plurality of power outlets 375 that are accessible when the tailgate 910 is in the down position. The plurality of power outlets 375 may be energized by a power inverter that is wired to the 12 VDC electrical system of the pickup truck 900 and that converts 12 VDC into 110-120 VAC available at the plurality of power outlets 375.

A plurality of cargo rails 260 may be U-shaped armatures that are coupled to the upper left side wall 240, to the upper right side wall 245, or to both. The plurality of cargo rails 260 may be horizontally oriented. The plurality of cargo rails 260 may be used to secure cargo.

The bed liner 200 may comprise a plurality of tiedown hooks 265. The plurality of tiedown hooks 265 may be cleats or hooks used to secure ropes, cords, straps or other cargo constraints. The plurality of tiedown hooks 265 may be located on the lower left side wall 220, on the lower right side wall 225, or on both.

The bed liner 200 may comprise a plurality of mounting holes 250. The plurality of mounting holes 250 may be apertures in the bed liner 200 used to attach the bed liner 200 to the truck bed 905.

Figure 1:
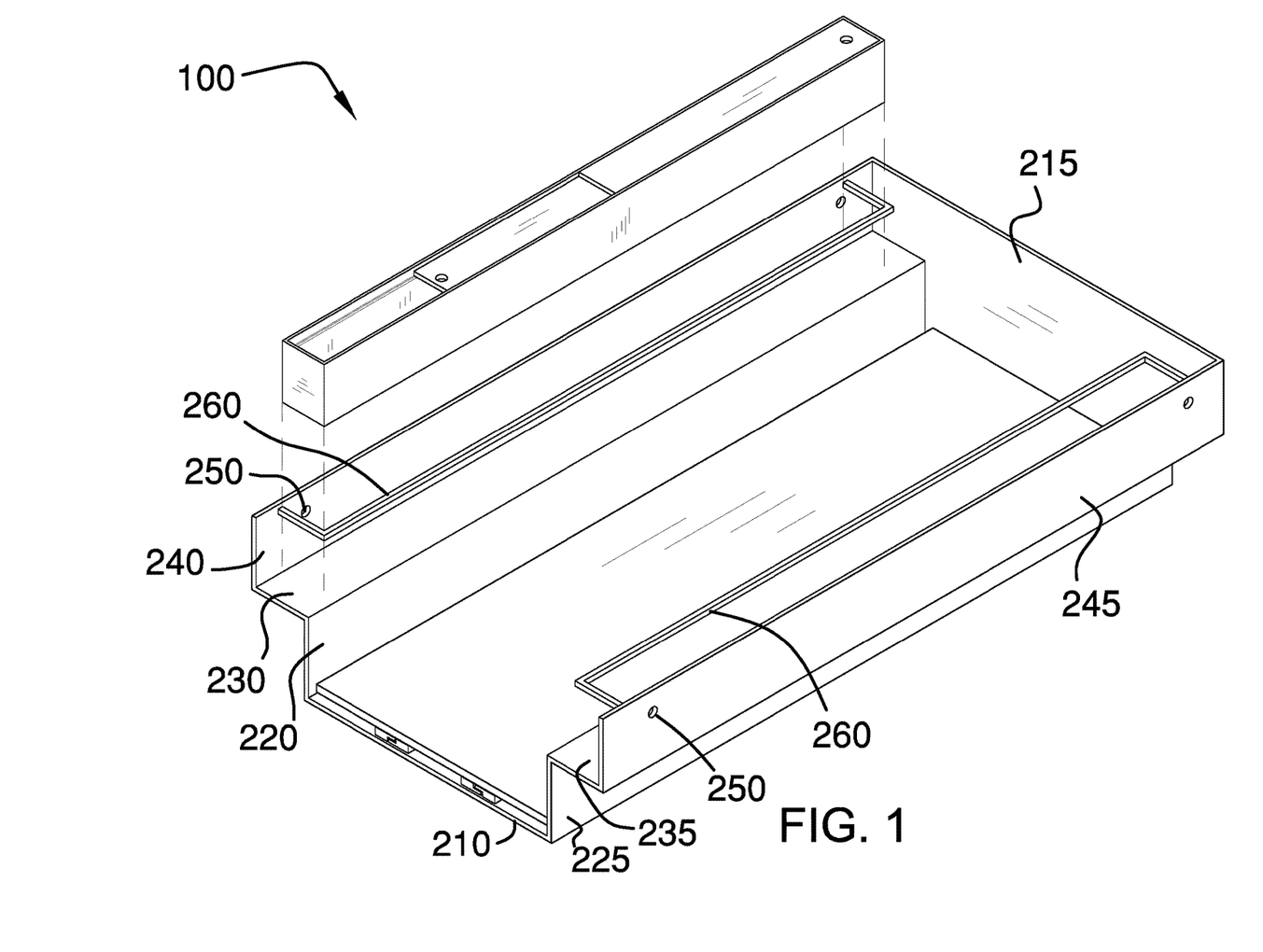
FIG. 1 is a perspective view of an embodiment of the disclosure illustrating the sliding bed in place in the liner.
Figure 2:
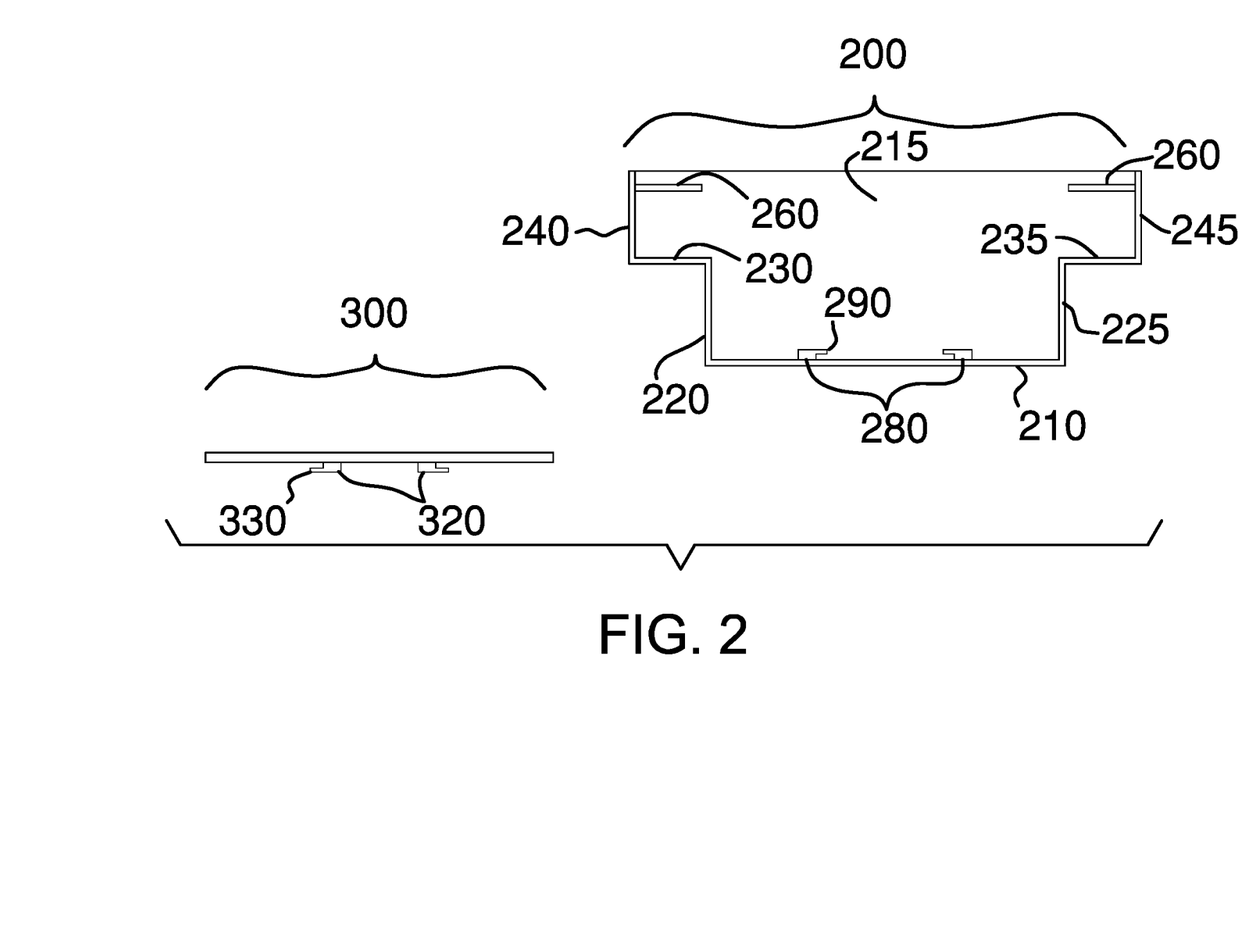
FIG. 2 is a front view of an embodiment of the disclosure.
Figure 3:
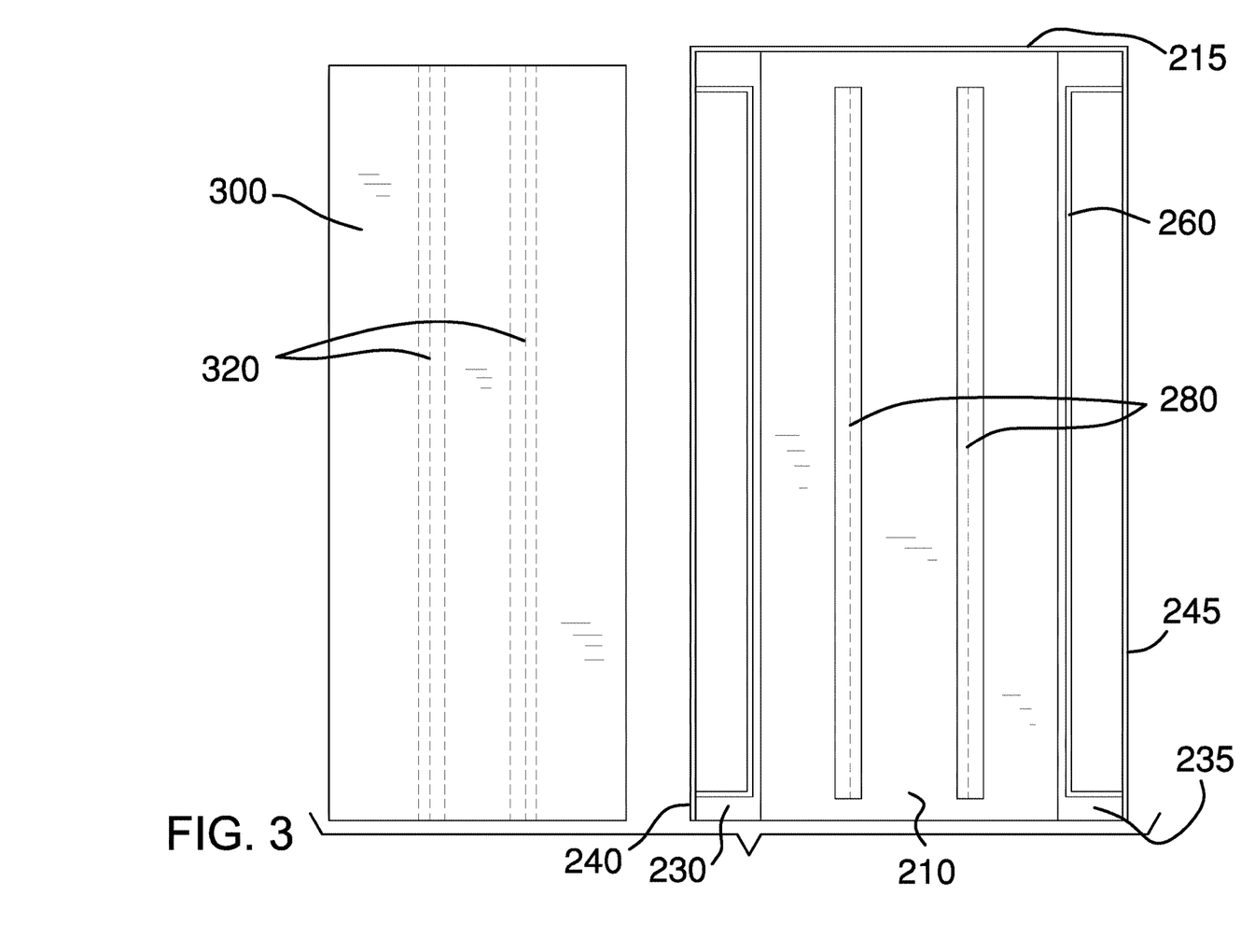
FIG. 3 is a top view of an embodiment of the disclosure.
Figure 4:
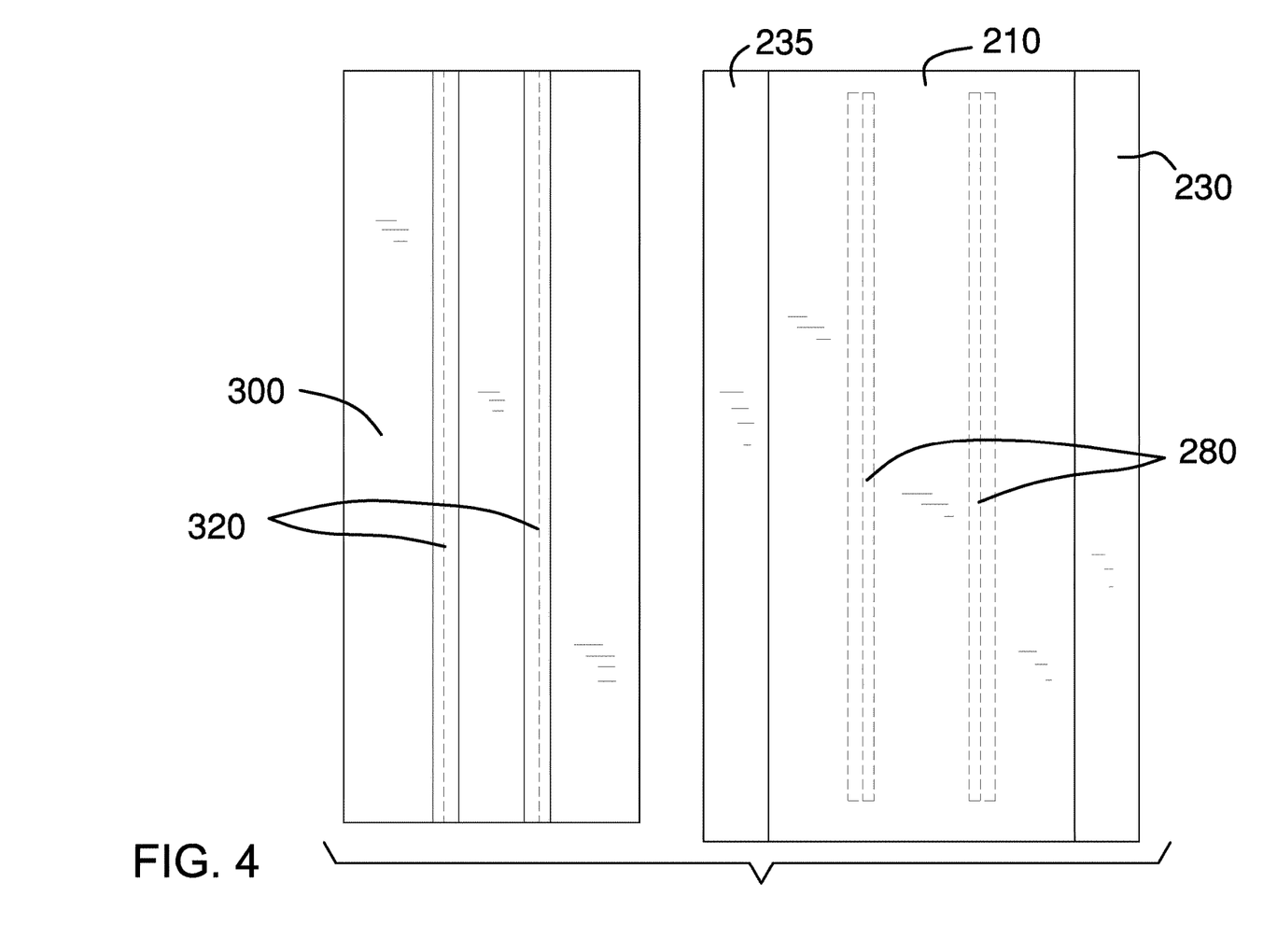
FIG. 4 is a bottom view of an embodiment of the disclosure.
Figure 5:
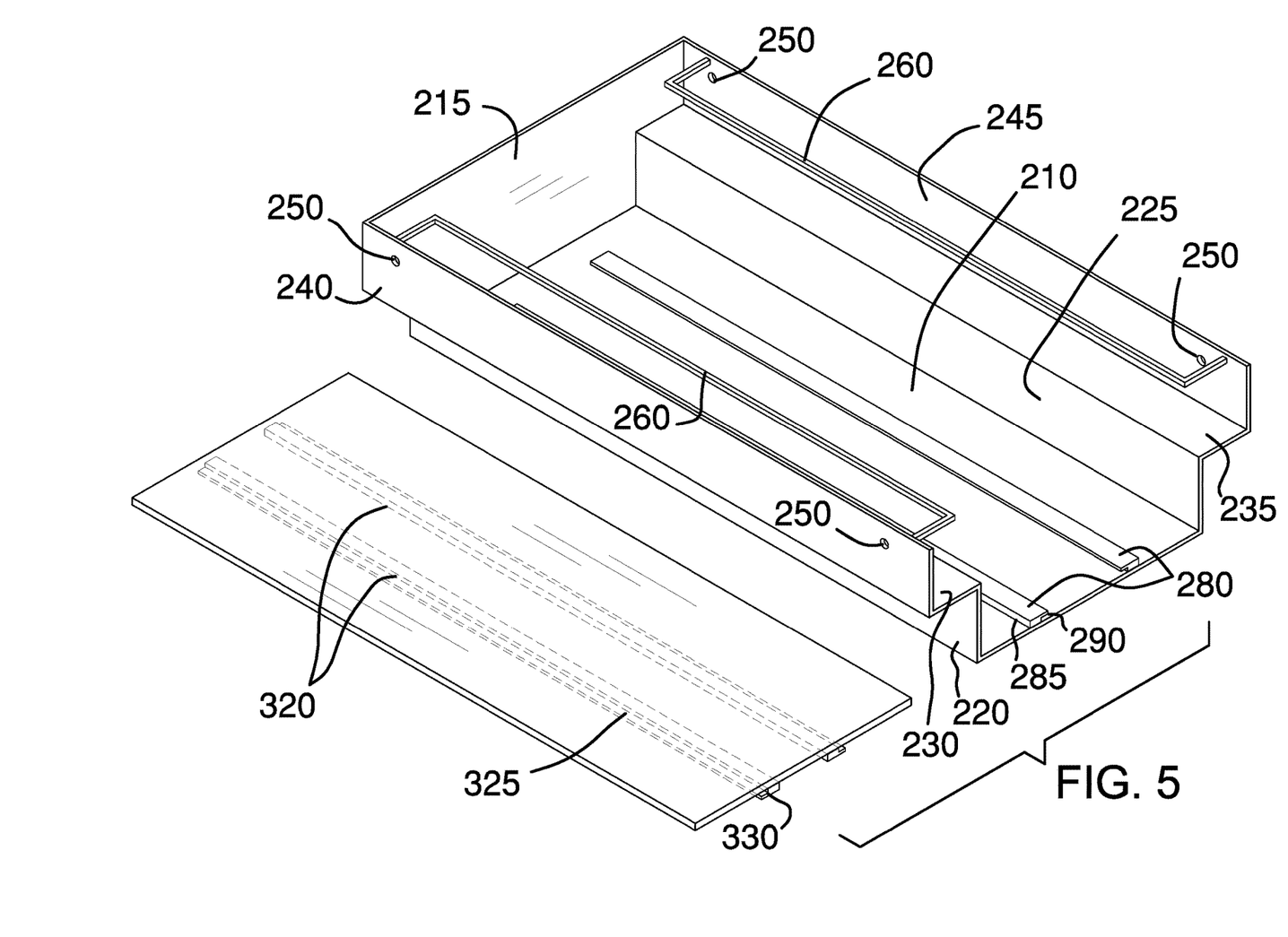
FIG. 5 is a perspective view of an embodiment of the disclosure illustrating the sliding bed removed from the liner.
Figure 6:
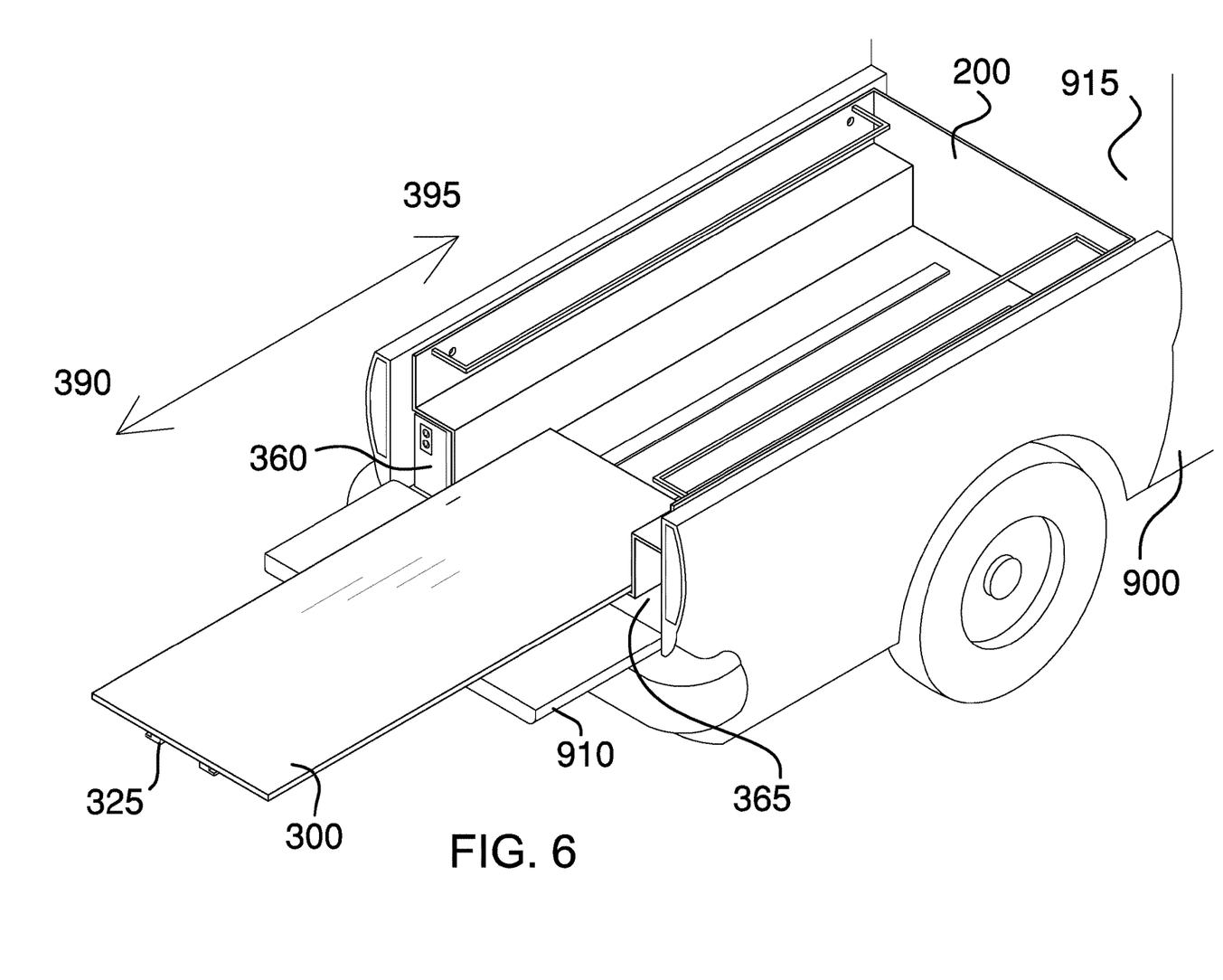
FIG. 6 is an in-use view of an embodiment of the disclosure illustrating the sliding bed extended rearwards.
Figure 7:
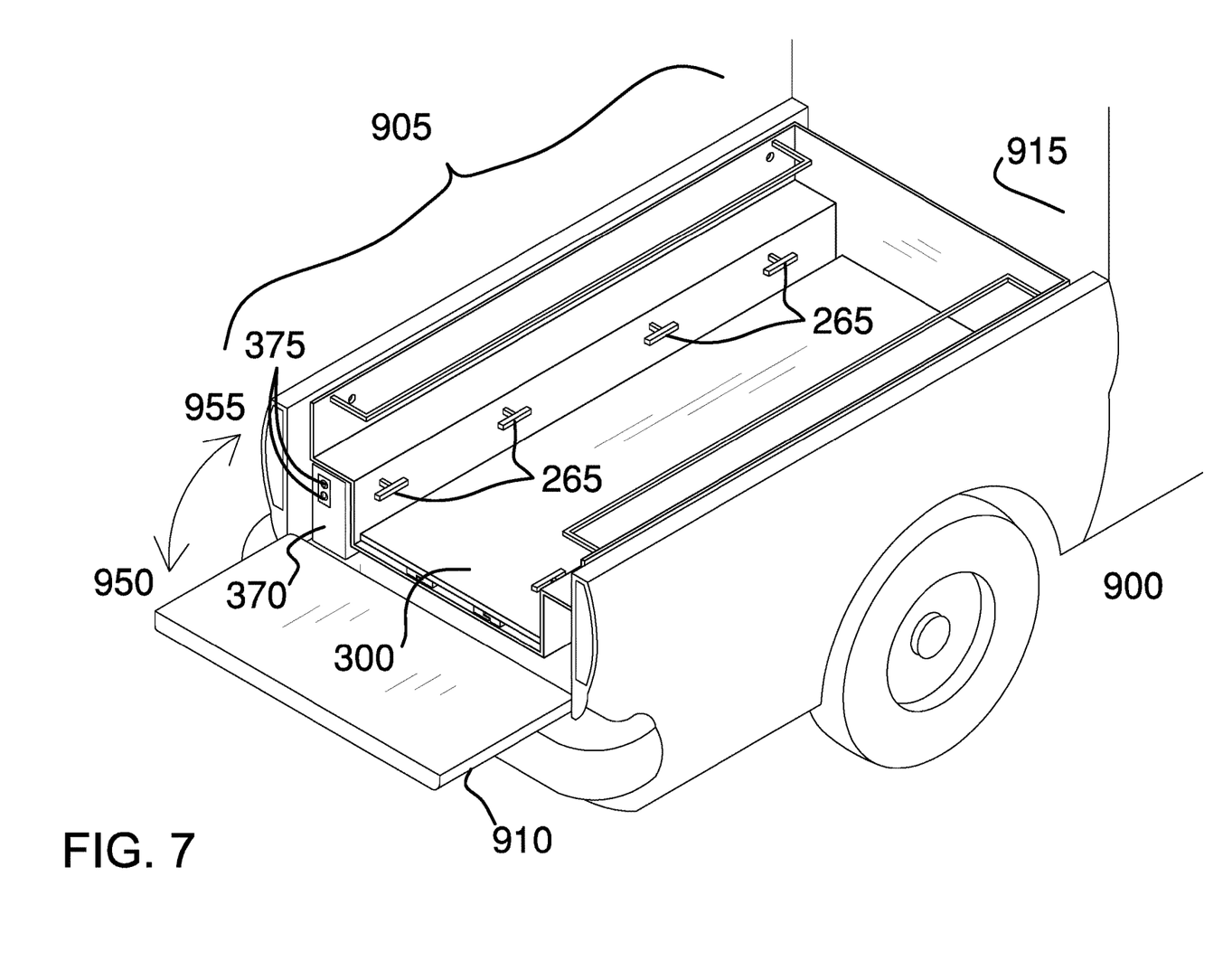
FIG. 7 is an in-use view of an embodiment of the disclosure illustrating the sliding bed retracted into the truck bed.
Figure 8:
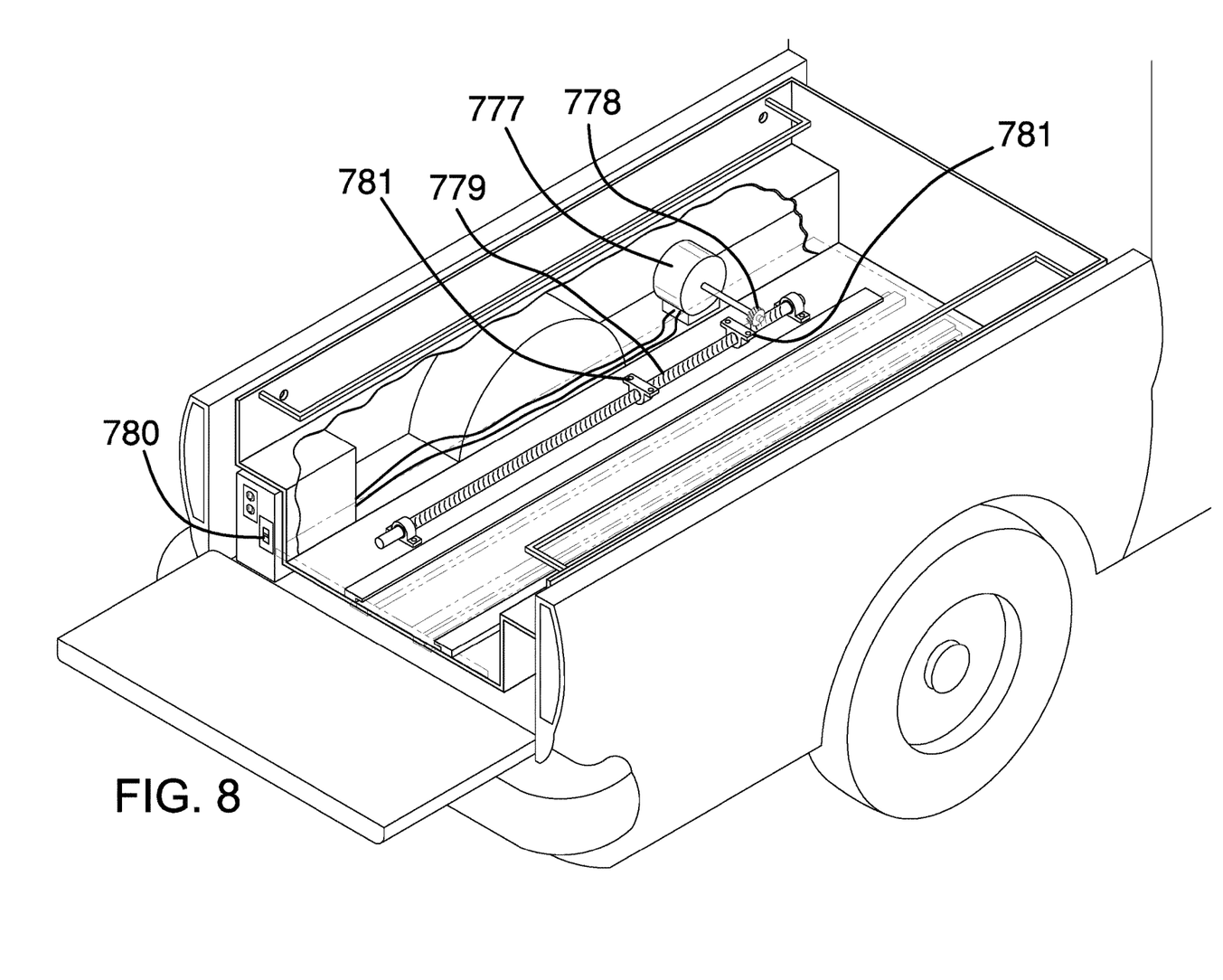
FIG. 8 illustrates a partial cut-away detailing the motor and means for movement of the sliding bed.

Referring to FIG. 8, the invention 100 includes a motor 777, a pinion gear 778, and a rack 779. The motor 777, the rack 778 and the pinion 779 are collectively responsible for the movement of the sliding bed 300 with respect to the invention 100. A switch 780 may be provided to control operation of the motor 777. At least one slide 781 is affixed to the sliding bed 300, which translates along the rack 779 when the rack 779 is being rotated either clockwise or counterclockwise. FIG. 8 is an example of the means used to provide movement to the sliding bed 300, and may be interchanged with other mechanisms capable of achieving this function.

In use, the bed liner 200 is placed within the truck bed 905 and attached to the truck bed 905 using mounting hardware. As non-limiting examples, the mounting hardware may be screws or bolts.

With the tailgate 910 in the down position, the sliding bed 300 may be slid towards the rear of the pickup truck 900 to extend outside of the truck bed 905. The cargo may be placed on the sliding bed 300 and the sliding bed 300 may be slid back into the truck bed 905. The tailgate 910 may be moved to the up position and the cargo may be secured using rope, cord, or straps coupled to the plurality of tiedown hooks 265. These steps may be reversed to remove the cargo from the truck bed 905.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, "cargo" refers to one or more objects that are intended to be transported using a vehicle.

As used in this disclosure, a "cavity" is an empty space or negative space that is formed within an object.

As used in this disclosure, a "cord" is a flexible piece of string, line, rope, or wire that is at least several times its diameter in length. Cords may be made from threads, yarns, piles, or strands of material that are braided or twisted together, from a monofilament, or from one or more wires. Cords have tensile strength but are too flexible to provide compressive strength and are not suitable for use in pushing objects. String, line, cable, twine, and rope may be synonyms for cord.

As used in this disclosure, the word "correspond" indicates that a first object is in some manner linked to a second object in a one to one relationship or that one or more properties shared by two or more objects match, agree, or align within acceptable manufacturing tolerances.

As used herein, the words "couple", "couples", "coupled" or "coupling", refer to connecting, either directly or indirectly, and does not necessarily imply a mechanical connection.

As used in this disclosure, the word "interior" is used as a relational term that implies that an object is located or contained within the boundary of a structure or a space.

As used in this disclosure, the word "lateral" refers to the sides of an object or movement towards a side. Lateral directions are generally perpendicular to longitudinal directions. "Laterally" refers to movement in a lateral direction.

As used herein, the word "longitudinal" or "longitudinally" refers to a lengthwise or longest direction.

As used herein, "mounting hardware" refers to mechanical devices that are used to attach one object to another, including devices whose only purpose is to improve aesthetics. As non-limiting examples, mounting hardware may include screws, nuts, bolts, washers, crossbars, hooks, collars, nipples, standoffs, knobs, caps, plates, rails, and brackets.

As used in this disclosure, an "outlet" is a device placed in the electrical wiring system of a building where electrical current can be taken to run electrical devices. In this disclosure, an outlet is a socket adapted to receive a plug. In some embodiments, an outlet may find use in a vehicle or on equipment. As non-limiting examples, outlets may be used on recreational vehicles and on generators.

As used in this disclosure, a "pickup truck" is a vehicle having an enclosed cab and an open body comprising low sides and a tailgate. The vehicle is typically powered by an internal combustion engine.

As used in this disclosure, a "tailgate" is a hinged door mounted on the rear of a pickup truck that can be pivoted open and, in some embodiments, removed in order to facilitate loading of the pickup truck.

As used in this disclosure, a "wheel" is a circular object that revolves around an axle or an axis and is fixed below an object to enable it to move easily over the ground.

Throughout this document references to "wire", "wires", "wired", or "wiring" may describe and/or show a single conductor when, in fact, two conductors may be required to power or control a subsystem; a convention used herein is to not show the common return conductor to which all electrical subsystems are connected—this common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A extensible truck bed platform comprising:
   a bed liner and a sliding bed;
   wherein the bed liner is a protective liner for a truck bed of a pickup truck;
   wherein the sliding bed is a movable bottom surface of the bed liner that moves longitudinally within the bed liner and extends rearward beyond the bed liner when extended;
   wherein the bed liner comprises a liner floor, a front wall, a lower left side wall, a lower right side wall, a left wheel well cover, a right wheel well cover, an upper left side wall, an upper right side wall, and a plurality of rail guides;
   wherein the bed liner covers the interior front, bottom and side surfaces of the truck bed;
   wherein the bed liner provides a mounting surface for the plurality of rail guides;
   wherein the top of the bed liner is open;
   wherein the rear side of the bed liner is open and is accessible when a tailgate of the pickup truck is in a down position;
   wherein the bed liner comprises a plurality of mounting holes;
   wherein a space between the bed liner and the truck bed at the rear of the truck bed forms a left storage cavity and a right storage cavity;
   wherein the left storage cavity and the right storage cavity are accessible when the tailgate is in the down position.

2. The extensible truck bed platform according to claim 1
   wherein the liner floor is a rectangular panel located at the bottom center of the bed liner;
   wherein the liner floor is horizontally oriented;
   wherein the longitudinal length of the liner floor is less than the longitudinal length of the truck bed such that the bed liner fits into the truck bed with the tailgate in an up position;
   wherein the front of the liner floor couples to an edge of the front wall;
   wherein the left edge of the liner floor couples to the lower left side wall;
   wherein the right edge of the liner floor couples to the lower right side wall.

3. The extensible truck bed platform according to claim 2
   wherein the front wall is a T-shaped panel that forms one wall at the front of the bed liner;
   wherein when the bed liner is in place in the truck bed, the front wall is located adjacent to a cab of the pickup truck;
   wherein the front wall is vertically oriented;
   wherein the sides and lower edges of the front wall couple to the front edges of the upper left side wall, the left wheel well cover, the lower left side wall, the liner floor, the lower right side wall, the right wheel well cover, and the upper right side wall.

4. The extensible truck bed platform according to claim 3
   wherein the lower left side wall is a rectangular panel located at the lower left of the bed liner;
   wherein the lower left side wall is vertically oriented;
   wherein the longitudinal length of the lower left side wall is less than the longitudinal length of the truck bed such that the bed liner fits into the truck bed with the tailgate in the up position;
   wherein the front of the lower left side wall couples to an edge of the front wall;
   wherein the top edge of the lower left side wall couples to the left wheel well cover;
   wherein the bottom edge of the lower left side wall couples to the liner floor.

5. The extensible truck bed platform according to claim 4
   wherein the lower right side wall is a rectangular panel located at the lower right of the bed liner;
   wherein the lower right side wall is vertically oriented;
   wherein the longitudinal length of the lower right side wall is less than the longitudinal length of the truck bed such that the bed liner fits into the truck bed with the tailgate in the up position;
   wherein the front of the lower right side wall couples to an edge of the front wall;
   wherein the top edge of the lower right side wall couples to the right wheel well cover;
   wherein the bottom edge of the lower right side wall couples to the liner floor.

6. The extensible truck bed platform according to claim 5
   wherein the left wheel well cover is a rectangular panel located on the left of the bed liner;
   wherein the left wheel well cover is horizontally oriented;
   wherein the longitudinal length of the left wheel well cover is less than the longitudinal length of the truck bed such that the bed liner fits into the truck bed with the tailgate in the up position;
   wherein the front of the left wheel well cover couples to an edge of the front wall;
   wherein the right edge of the left wheel well cover couples to the lower left side wall;

wherein the left edge of the left wheel well cover couples to the upper left side wall.

7. The extensible truck bed platform according to claim 6
wherein the right wheel well cover is a rectangular panel located on the right of the bed liner;
wherein the right wheel well cover is horizontally oriented;
wherein the longitudinal length of the right wheel well cover is less than the longitudinal length of the truck bed such that the bed liner fits into the truck bed with the tailgate in the up position;
wherein the front of the right wheel well cover couples to an edge of the front wall;
wherein the left edge of the right wheel well cover couples to the lower right side wall;
wherein the right edge of the right wheel well cover couples to the upper right side wall.

8. The extensible truck bed platform according to claim 7
wherein the upper left side wall is a rectangular panel located at the upper left of the bed liner;
wherein the upper left side wall is vertically oriented;
wherein the longitudinal length of the upper left side wall is less than the longitudinal length of the truck bed such that the bed liner fits into the truck bed with the tailgate in the up position;
wherein the front of the upper left side wall couples to an edge of the front wall;
wherein the bottom edge of the upper left side wall couples to the left wheel well cover.

9. The extensible truck bed platform according to claim 8
wherein the upper right side wall is a rectangular panel located at the upper right of the bed liner;
wherein the upper right side wall is vertically oriented;
wherein the longitudinal length of the upper right side wall is less than the longitudinal length of the truck bed such that the bed liner fits into the truck bed with the tailgate in the up position;
wherein the front of the upper right side wall couples to an edge of the front wall;
wherein the bottom edge of the upper right side wall couples to the right wheel well cover.

10. The extensible truck bed platform according to claim 9
wherein the front wall, the liner floor, the upper left side wall, the upper right side wall, the left wheel well cover, the right wheel well cover, the lower left side wall, and the lower right side wall are made from metal, fiberglass, plastic, or combinations thereof.

11. The extensible truck bed platform according to claim 9
wherein the plurality of rail guides are armatures coupled to the top surface of the liner floor;
wherein the plurality of rail guides are horizontally oriented and run from front to rear;
wherein the plurality of rail guides are parallel to each other;
wherein each individual rail guide selected from the plurality of rail guides comprises one or more guide overhangs for interlocking with one of a plurality of rails.

12. The extensible truck bed platform according to claim 11
wherein the sliding bed is a movable, rectangular surface that slidably couples to the liner floor;
wherein the sliding bed is horizontally oriented;
wherein the lateral width of the sliding bed is less than the lateral width of the liner floor such that the sliding bed moves between the lower left side wall of the bed liner and the lower right side wall of the bed liner;
wherein the longitudinal length of the sliding bed is less than the longitudinal length of the truck bed such that the sliding bed fits into the bed liner with the tailgate in the up position.

13. The extensible truck bed platform according to claim 12
wherein the sliding bed comprises the plurality of rails;
wherein the plurality of rails are armatures coupled to the bottom side of the sliding bed;
wherein the plurality of rails are horizontally oriented and run from front to rear;
wherein the plurality of rails are parallel to each other;
wherein each individual rail selected from the plurality of rails comprises one or more rail overhangs for interlocking with one of the plurality of rail guides.

14. The extensible truck bed platform according to claim 13
wherein the lateral positioning and spacing of the plurality of rails corresponds to the lateral positioning and spacing of the plurality of rail guides such that the one or more rail overhangs of each of the individual rails overlap the one or more guide overhangs of at least one of the individual rail guides;
wherein the positioning and overlapping of the plurality of rail guides and the plurality of rails prevents the sliding bed from moving vertically or laterally but allows the sliding bed to move longitudinally.

15. The extensible truck bed platform according to claim 14
wherein the extensible truck bed platform comprises an outlet panel covering the left storage cavity or the right storage cavity;
wherein the outlet panel provides a plurality of power outlets that are accessible when the tailgate is in the down position;
wherein the plurality of power outlets are energized by a power inverter that is wired to the 12 VDC electrical system of the pickup truck and that converts 12 VDC into 110-120 VAC available at the plurality of power outlets.

16. The extensible truck bed platform according to claim 14
wherein a plurality of cargo rails are U-shaped armatures that are coupled to the upper left side wall, to the upper right side wall, or to both;
wherein the plurality of cargo rails are horizontally oriented;
wherein the plurality of cargo rails are used to secure cargo.

17. The extensible truck bed platform according to claim 14
wherein the bed liner comprises a plurality of tiedown hooks;
wherein the plurality of tiedown hooks are cleats or hooks used to secure ropes, cords, straps or other cargo constraints;
wherein the plurality of tiedown hooks are located on the lower left side wall, on the lower right side wall, or on both;
wherein the plurality of mounting holes are apertures in the bed liner used to attach the bed liner to the truck bed.

* * * * *